No. 891,349. PATENTED JUNE 23, 1908.
J. S. LODER.
SMELTING FURNACE.
APPLICATION FILED SEPT. 18, 1906.

2 SHEETS—SHEET 1.

Witnesses
J. G. Hinkel
Milton Tibbetts.

Inventor
John S. Loder,
by Foster, Freeman & Watson,
Attorneys

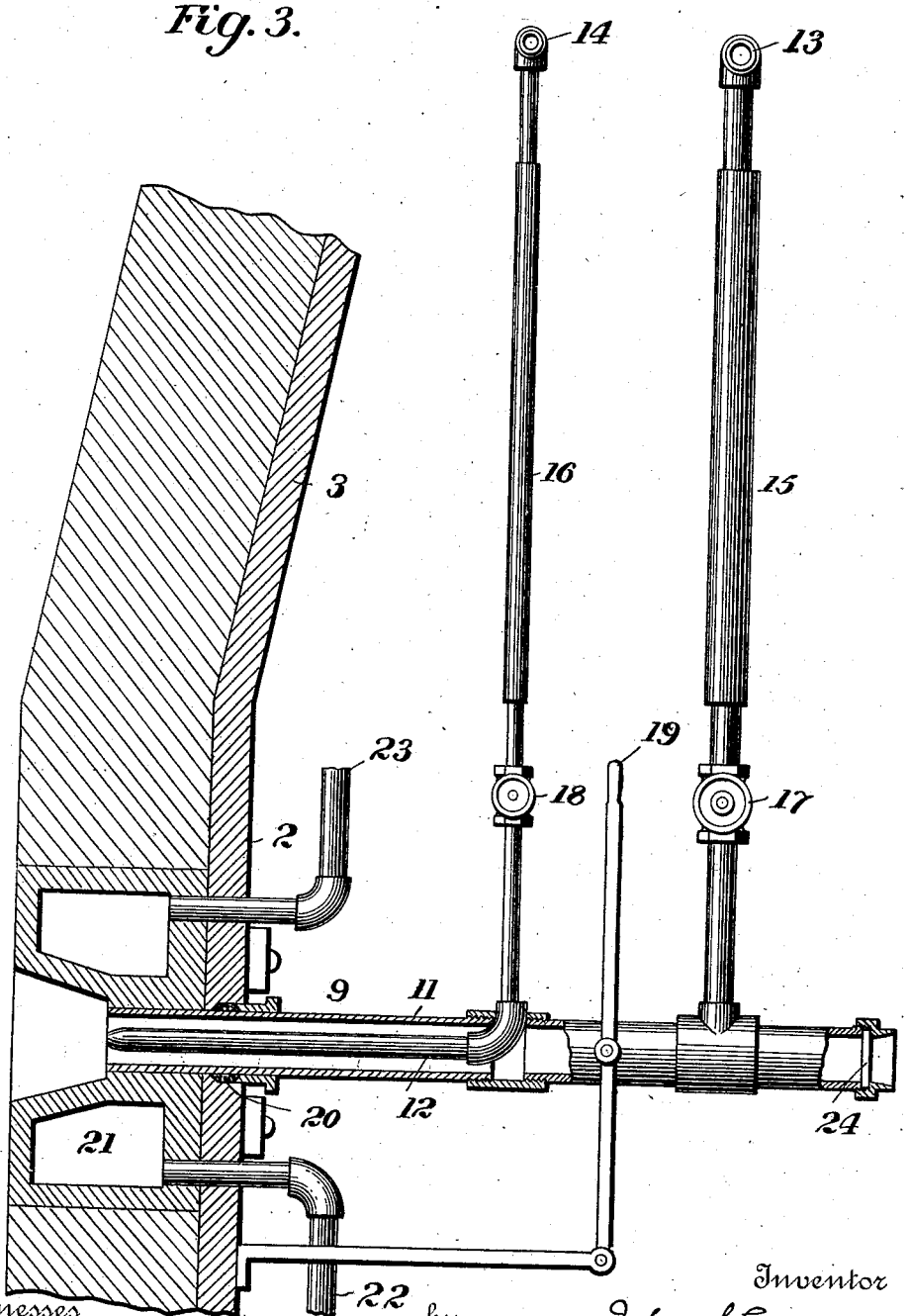

UNITED STATES PATENT OFFICE.

JOHN S. LODER, OF RENO, NEVADA, ASSIGNOR TO THE LODER SMELTER AND REFINER COMPANY, OF RENO, NEVADA, A CORPORATION OF NEVADA.

SMELTING-FURNACE.

No. 891,349.

Specification of Letters Patent.

Patented June 23, 1908.

Application filed September 18, 1906. Serial No. 335,094.

*To all whom it may concern:*

Be it known that I, JOHN S. LODER, a citizen of the United States, residing at Reno, Washoe county, State of Nevada, have invented certain new and useful Improvements in Smelting-Furnaces, of which the following is a specification.

This invention relates to smelting furnaces and particularly to furnaces of the vertical shaft variety, and its object is to provide a furnace in which the ore may be reduced by a continuous operation and by means of heat produced by the combustion of a fuel and a gas containing oxygen without the use of hard fuels of any kind.

These objects are accomplished by a furnace and burners in connection therewith substantially as hereinafter described in connection with the drawings forming part of this specification, in which—

Figure 1:
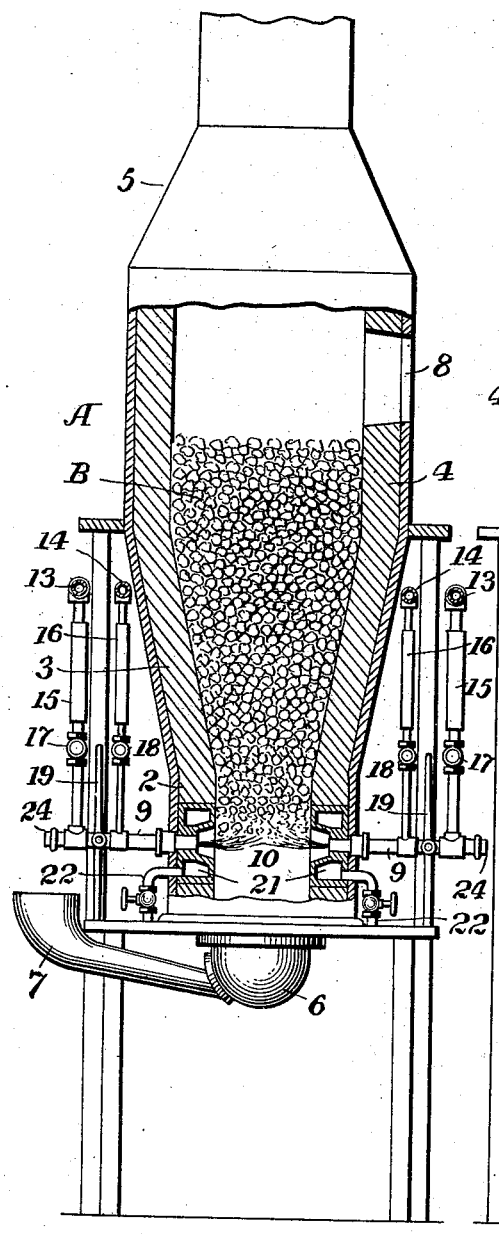
Figure 2:
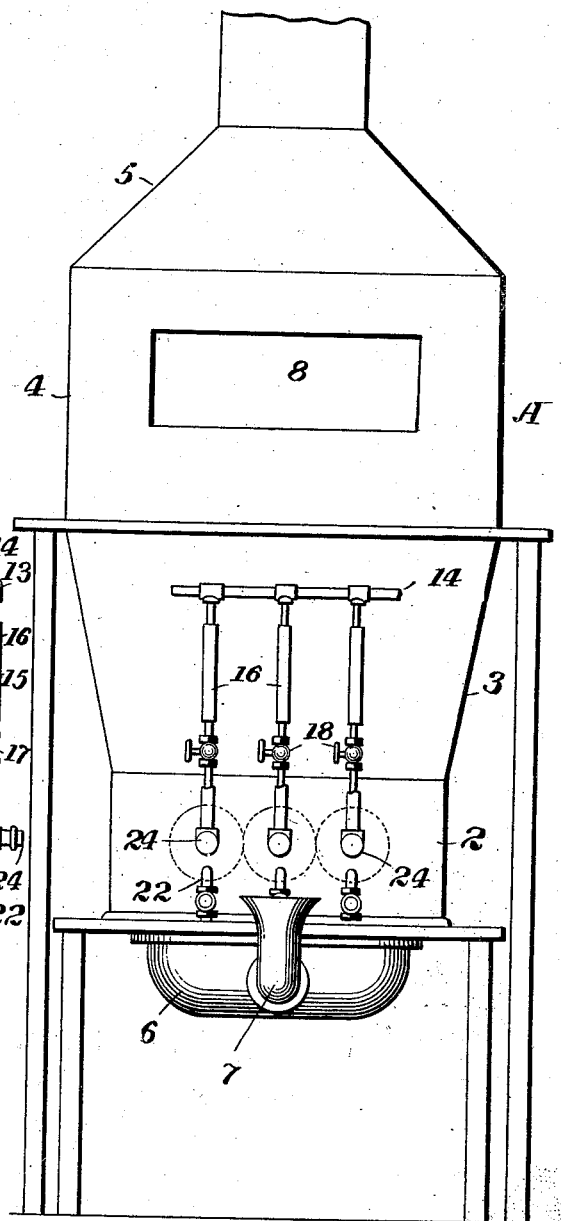

Figure 1 is a vertical section; Fig. 2 a side elevation, and Fig. 3 a view in elevation and part section showing on a larger scale the burner and the surrounding part of the furnace wall.

The furnace A is made up of the four vertical side walls 2 forming a chamber much greater in length than in width, the fuel chamber having the upwardly diverging side walls 3, the upper walls 4, and the stack 5. The bottom of the furnace is formed by a well 6 communicating with a trap 7 from which the bullion is ladled out as it is required. An opening 8 is provided in one of the upper walls for charging the furnace with the ore B.

In consequence of the narrow width of the combustion chamber and the diverging of the side walls of the ore chamber above the combustion chamber, the ore in the latter tends to jam in the space above the combustion chamber so that it is held above the melting zone.

In the long parallel side walls 2 are openings into which extend opposing series of burners 9 to which is supplied both air and a liquid or gaseous fuel under considerable pressure and the ignited gases from the burners play at a very high heat against the bottom of the mass of ore causing the latter to fuse at about the point 10 in a comparatively short space of time.

The parts 6 and 7 constitute a trap the contents of which, being heavy molten metal, effectually close the bottom of the combustion chamber and the high pressure of the gases (from thirty to sixty pounds to the square inch) insures such a pressure in the combustion chamber that it tends to support the mass of ore above and hold the ore charge at the fusion point until fusion ensues. By this means the extent of space required in the use of hard fuel, and the loss of time required to bring the latter up to a point to fuse the ore, are avoided, and as the fusion point is always the same, and as the gases may be fed with regularity, there is a much more uniform action than is possible in the ordinary furnace when hard fuel is employed.

The burner 9 comprises the air supply tube 11 and concentrically arranged therein, the fuel supply tube 12, these tubes respectively being supplied from pressure supply pipes 13 and 14, having flexible connections 15 and 16 and regulating valves 17 and 18. The tube 11 and consequently the inclosed tube 12, is arranged to be adjusted toward or away from the center of the furnace, and this adjustment may be accomplished by means of the lever 19 operatively connected therewith as shown in Fig. 3. The joint between the tube 11 and the furnace wall is preferably closed by suitable packing 20.

As the exceedingly high heat produced by the combustion would be destructive to the burner tubes, I form a water jacket 21 around each of the burners, having suitable inlet and outlet pipes 22 and 23 respectively, best shown in Fig. 3.

The rear end of the burner is supplied with a glass covering 24 whereby a view by the operator into the combustion chamber is permitted to determine the degree of heat produced.

It will be readily understood from the above described arrangement that the burner 9 may be moved toward the center of the furnace by the lever 19 to increase the heat at the point of fusion, and vice versa; also that the degree of heat may of course be regulated by manipulating the valves 17 and 18, thus varying the relative quantity of air and fuel supplied to the burner. It will be further understood that the regulation by the valves 17 and 18 of the supplies of air and fuel respectively will cause an increase or decrease, as the case may be, in the pressure under the ore, which pressure, as before stated, acts in conjunction with the sloping walls 3 to support the ore to a greater or less degree as is required to produce a perfect fusion of the metal.

What I claim is,—

1. The combination with a furnace having openings opposite the combustion chamber thereof, of burners extending into said openings and longitudinally adjustable, air and fuel supply pipes, and flexible connections between the said pipes and each burner.

2. The combination with a furnace having side openings opposite the combustion chamber, of an air pipe extending into said openings, means for adjusting the air pipe longitudinally, a fuel pipe extending into the air pipe and flexible connections for supplying the air pipe and the fuel pipe with air and fuel.

In testimony whereof I affix my signature in presence of two witnesses.

JOHN S. LODER.

Witnesses:
 E. G. CAMPBELL,
 M. S. NEALE.